United States Patent
Perego et al.

(10) Patent No.: US 7,884,284 B2
(45) Date of Patent: Feb. 8, 2011

(54) ENERGY CABLE COMPRISING A DIELECTRIC FLUID AND A MIXTURE OF THERMOPLASTIC POLYMERS

(75) Inventors: Gabriele Perego, Milan (IT); Sergio Belli, Milan (IT)

(73) Assignee: Prysmian Cavi E Sistemi Energia S.r.l., Milan (IT)

( * ) Notice: Subject to any disclaimer, the term of this patent is extended or adjusted under 35 U.S.C. 154(b) by 0 days.

(21) Appl. No.: 12/083,101

(22) PCT Filed: Oct. 25, 2005

(86) PCT No.: PCT/EP2005/011437

§ 371 (c)(1),
(2), (4) Date: May 8, 2009

(87) PCT Pub. No.: WO2007/048422

PCT Pub. Date: May 3, 2007

(65) Prior Publication Data

US 2009/0211782 A1    Aug. 27, 2009

(51) Int. Cl.
*H01B 7/00*    (2006.01)
(52) U.S. Cl. .............................. 174/110 R; 174/120 R; 174/121 SR
(58) Field of Classification Search ...... 174/110 R–110 FC, 113 R, 120 R, 120 C, 120 AR
See application file for complete search history.

(56) References Cited

U.S. PATENT DOCUMENTS

| | | | | |
|---|---|---|---|---|
| 4,543,207 | A | * | 9/1985 | Sato et al. .................... 252/570 |
| 4,621,302 | A | * | 11/1986 | Sato et al. .................... 361/315 |
| 4,857,673 | A | * | 8/1989 | Wilkus et al. .......... 174/110 PM |

(Continued)

FOREIGN PATENT DOCUMENTS

EP    0 987 718 A1    3/2000

(Continued)

OTHER PUBLICATIONS

ASTM D 790-95a, Standard Test Methods for Flexural Properties of Unreinforced and Reinforced Plastics and Electrical Insulating Materials (Publ. 1996).

(Continued)

*Primary Examiner*—William H Mayo, III
(74) *Attorney, Agent, or Firm*—Finnegan, Henderson, Farabow, Garrett & Dunner, L.L.P.

(57) ABSTRACT

A cable includes at least one electrical conductor and at least one extruded covering layer including a thermoplastic polymer material in admixture with a dielectric liquid, wherein the thermoplastic polymer material includes (a) at least 75% by weight, with respect to the total weight of the thermoplastic polymer material, of at least one copolymer of at least two α-olefin co-monomers, the copolymer having a melting enthalpy lower than 25 J/g; and (b) an amount equal to or less than 25% by weight with respect to the total weight of the thermoplastic polymer material of at least one propylene homopolymer or propylene copolymer with at least one α-olefin, the at least one propylene homopolymer or propylene copolymer having a melting enthalpy higher than 25 J/g and a melting point higher than 130° C. The covering layer has a melting enthalpy equal to or lower than 40 J/g, and the concentration by weight of the dielectric liquid in the thermoplastic polymer material is lower than the saturation concentration of the dielectric liquid in the thermoplastic polymer material.

49 Claims, 1 Drawing Sheet

U.S. PATENT DOCUMENTS

| | | | |
|---|---|---|---|
| 5,017,733 A * | 5/1991 | Sato et al. | 585/6.3 |
| 5,192,463 A | 3/1993 | Berger et al. | |
| 5,446,228 A * | 8/1995 | Commandeur et al. | 585/613 |
| 5,545,355 A * | 8/1996 | Commandeur et al. | 252/570 |
| 5,601,755 A * | 2/1997 | Commandeur et al. | 252/570 |
| 6,001,933 A * | 12/1999 | Tsuruoka et al. | 525/232 |
| 6,562,907 B2 | 5/2003 | Johoji et al. | |
| 7,196,270 B2 | 3/2007 | Perego et al. | |
| 2002/0120065 A1 | 8/2002 | Johoji et al. | |

FOREIGN PATENT DOCUMENTS

| | | |
|---|---|---|
| WO | WO 98/32137 | 7/1998 |
| WO | WO-98/52197 | 11/1998 |
| WO | WO 99/13477 | 3/1999 |
| WO | WO 00/41187 | 7/2000 |
| WO | WO 01/37289 A1 | 5/2001 |
| WO | WO-02/03398 A1 | 1/2002 |
| WO | WO-02/27731 A1 | 4/2002 |
| WO | WO 02/47092 A1 | 6/2002 |
| WO | WO-2004/066317 A1 | 8/2004 |
| WO | WO-2004/066318 A1 | 8/2004 |

OTHER PUBLICATIONS

CEI EN 60811-3-1, Insulating and Sheathing Materials of Electrical Cables, Part 3: Methods Specific to PVC Compounds, Section 1: Pressure Test at High Temperature- Tests for Resistance to Cracking (Aug. 8, 2001).

CEI IEC 60247, Insulating Liquids—Measurement of Relative Permittivity, Dielectric Dissipating Factor and DC Resistivity (3rd Ed. Feb. 2004).

* cited by examiner

FIG. 1

ENERGY CABLE COMPRISING A DIELECTRIC FLUID AND A MIXTURE OF THERMOPLASTIC POLYMERS

BACKGROUND OF THE INVENTION

The present invention relates to an energy cable. In particular, the invention relates to a cable for transporting or distributing medium or high voltage electric energy, wherein an extruded covering layer based on a thermoplastic polymer material in admixture with a dielectric liquid is present, enabling, in particular, the use of high operating temperatures together and providing the cable with improved flexibility.

Said cable may be used for both direct current (DC) or alternating current (AC) transmission or distribution.

The requirement for products of high environmental compatibility, composed of materials which, in addition to not being harmful to the environment during production or utilization, may be easily recycled at the end of their life, is now fully accepted in the field of electrical and telecommunications cables.

However the use of materials compatible with the environment is conditioned by the need to limit costs while, for the more common uses, providing a performance equal to or better than that of conventional materials.

In the case of cables for transporting medium and high voltage energy, the various coverings surrounding the conductor commonly consist of polyolefin-based crosslinked polymer, in particular crosslinked polyethylene (XLPE), or elastomeric ethylene/propylene (EPR) or ethylene/propylene/diene (EPDM) copolymers, also crosslinked. The crosslinking, effected after the step of extrusion of the polymeric material onto the conductor, gives the material satisfactory mechanical and electrical properties even under high temperatures both during continuous use and with current overload.

It is well known however that crosslinked materials cannot be recycled, so that manufacturing wastes and covering material of cables at the end of their life may be disposed of only by incineration.

RELATED ART

WO 02/03398 and WO 02/27731, both in the Applicant's name, disclose cables comprising at least one electrical conductor and at least one extruded covering layer based on thermoplastic polymer material in admixture with a dielectric liquid, wherein said thermoplastic material comprises a propylene homopolymer or a copolymer of propylene with at least one olefin comonomer selected from ethylene and an α-olefin other than propylene, said homopolymer or copolymer having a melting point greater than or equal to 140° C. and a melting enthalpy of from 30 J/g to 100 J/g. Alternatively, as thermoplastic base material, a propylene homopolymer or copolymer as hereinbefore defined can be used in mechanical mixture with a low crystallinity polymer, generally with a melting enthalpy of less than 30 J/g, which mainly acts to increase flexibility of the material. The quantity of low crystallinity polymer is generally less than 70 wt %, and preferably from 20 to 60 wt %, on the total weight of the thermoplastic material.

WO 04/066318 in the Applicant's name refers to a cable comprising at least one electrical conductor and at least one extruded covering layer based on a thermoplastic polymer material in admixture with a dielectric liquid, wherein said thermoplastic polymer material is selected from:

(a) at least one propylene homopolymer or at least one copolymer of propylene with at least one olefin comonomer selected from ethylene and an α-olefin other than propylene, said homopolymer or copolymer having a melting point greater than or equal to 130° C. and a melting enthalpy of from 20 J/g to 100 J/g;

(b) a mechanical mixture comprising at least one propylene homopolymer or copolymer (a) and (c) at least one elastomeric copolymer of ethylene with at least one aliphatic α-olefin, and optionally a polyene. The elastomeric copolymer of ethylene (c) has a melting enthalpy of less than 30 J/g. The quantity of said elastomeric copolymer (c) is generally less than 70% by weight, preferably of from 20% by weight to 60% by weight, with respect to the total weight of the thermoplastic base material.

U.S. Pat. No. 6,562,907, in the name of Sumitomo Chemical Co. Ltd., relates to a resin composition consisting essentially of 70 parts by weight of an olefin polymer and 30 parts by weight of one polypropylene resin selected from the group consisting of the following polymers (A) and (B), i.e. (A) a propylene-ethylene copolymer, which has a crystal melting calorie of 87±5 J/g measured according to JIS K7122 with a differential scanning calorimeter (DSC), and (B) a propylene-ethylene copolymer, which has a crystal melting calorie of 60±5 J/g measured according to JIS K7122 with a differential scanning calorimeter (DSC). The thermoplastic resin may be added with mineral oil softeners such as naphthene oil and paraffin mineral oil. The resin can be applied for uses such as electric wires, for example, plastic cables, insulation wires and wire-protecting materials.

The Applicant noticed that energy cables with a covering layer according to the prior art show good thermal-mechanical properties, but a relatively low flexibility due, inter alia, to the stiffness of the polymeric material for the cable covering layer/s. Flexibility is particularly appreciated during the operations of laying the cables or of installing equipment connected thereto. This characteristic is connected with the material crystallinity since by increasing amorphous polymer fraction the material becomes softer and more flexible. However the elastic modulus of a polyolefinic material decreases with temperature, so that a crystallinity decrease is also accompanied by a decrease of mechanical properties at high temperatures. This can be a problem under severe working conditions, such as an overload. It was therefore expected that values of melting enthalpy lower than the minimum values reported in the prior art were insufficient to guarantee the suitable needed thermopressure resistance

SUMMARY OF THE INVENTION

The Applicant has now found that it is possible to improve the flexibility of a cable without impairing the thermal-mechanical characteristics thereof by providing the cable with at least one covering layer comprising as major polymer base material a first thermoplastic copolymer showing a low crystallinity (expressed as melting enthalpy), and, as minor polymer material, a second thermoplastic polymer o copolymer showing a crystallinity higher than that of the first copolymer and a melting temperature higher than 130° C.

The resultant covering layer provides the cable with a superior flexibility, without impairing the thermal-mechanical characteristics and electrical performance, such as to make it particularly suitable for use in an energy cable, for example as electrical insulating layer of a medium or high voltage cable of high operating temperature, of at least 90° C.

and beyond, in particular at operating temperature up to 110° C. for continuous use and up to at least 130° C. in the case of current overload.

According to a first aspect, the present invention relates to an energy cable comprising at least one electrical conductor and at least one extruded covering layer including a thermoplastic polymer material in admixture with a dielectric liquid, wherein said thermoplastic polymer material comprises (a) at least 75% by weight, with respect to the total weight of the thermoplastic polymer material, of at least one copolymer of at least two α-olefin comonomers, said copolymer having a melting enthalpy lower than 25 J/g; and (b) an amount equal to or less than 25% by weight with respect to the total weight of the thermoplastic polymer material of at least one propylene homopolymer or propylene copolymer with at least one α-olefin, said at least one propylene homopolymer or propylene copolymer having a melting enthalpy higher than 25 J/g and a melting point higher than 130° C.;

and wherein said covering layer has a melting enthalpy equal to or lower than 40 J/g, and the concentration by weight of said dielectric liquid in said thermoplastic polymer material is lower than the saturation concentration of said dielectric liquid in said thermoplastic polymer material.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

In the present description and claims, the term "in admixture" means that the thermoplastic polymer material and the dielectric liquid are mixed together to provide a substantially homogeneous dispersion of the liquid into the polymer matrix (single phase).

In the present description and in the subsequent claims, as "conductor" it is meant a conducting element as such, of elongated shape and preferably of a metallic material, either in rod or in multi-wire form, more preferably aluminium or copper, or a conducting element as before coated with a semiconductive layer.

In the present description an claims, as "covering layer" it is meant a polymeric layer surrounding the conductor, for example, an electrically insulating layer, a semiconductive layer, a sheath, a protective layer, said protective layer being optionally foamed, a water blocking layer, or a layer performing combined functions, for example, a protective layer charged with a conductive filler.

As "electrically insulating layer" it is meant a covering layer made of a material having insulating properties, namely a having a dielectric rigidity of at least 5 kV/mm, preferably greater than 10 kV/mm.

As "semiconductive layer" it is meant a covering layer made of a material having semiconductive properties, such as a polymeric matrix added with, e.g., carbon black. For example, the polymeric matrix is added with an amount of carbon black such as to obtain a volumetric resistivity value, at room temperature, of less than 500 Ω·m, preferably less than 20 Ω·m. Typically, the amount of carbon black can range between 1 and 50% by weight, preferably between 3 and 30% by weight, relative to the weight of the polymer.

According to a first embodiment, the extruded covering layer based on said thermoplastic polymer material in admixture with said dielectric liquid is an electrically insulating layer.

According to a further embodiment, the extruded covering layer based on said thermoplastic polymer material in admixture with said dielectric liquid is a semiconductive layer.

The melting enthalpy ($\Delta H_m$) can be determined by Differential Scanning Calorimetry (DSC) analysis.

Preferably, the copolymer (a) is present in an amount of from 80% by weight to 95% by weight with respect to the total weight of the thermoplastic polymer material. A higher amount of copolymer (a) in the thermoplastic material for the cable of the invention could provide an unsuitable decrease of the thermopressure.

Preferably, the copolymer (a) has a melting enthalpy from 15 J/g to 10 J/g. The melting enthalpy of the copolymer (a) can also be lower than 10 J/g, for example 0 J/g.

The copolymer (a) can be provided in form of either or granules or bales. When the melting enthalpy of a copolymer (a) is, for example, lower than 10 J/g, the copolymer is generally provided in form of bales. A copolymer (a) in granule form is preferred according to the invention in view of the easy workability thereof.

Advantageously, the copolymer (a) has a flexural modulus of from 80 MPa to 10 MPa, more preferably of from 40 MPa to 20 MPa. The flexural modulus of the copolymer (a) can also be lower than 10 MPa, for example 1 MPa.

The at least two α-olefin comonomers of the at least one copolymer (a) can be selected from ethylene or an α-olefin of formula $CH_2=CH-R$, where R is a linear or branched $C_1$-$C_{10}$ alkyl, selected, for example, from: propylene, 1-butene, 1-pentene, 4-methyl-1-pentene, 1-hexene, 1-octene, 1-decene, 1-dodecene, preferably from ethylene, propylene, butene and octene.

Propylene/ethylene copolymers are particularly preferred.

Preferably, at least one of the at least two α-olefin comonomers is propylene.

The copolymer (a) for the cable of the invention can be a random copolymer or a heterophase copolymer.

As "random copolymer" is herein meant a copolymer in which the monomers are randomly distributed across the polymer chain.

As "heterophase copolymer" is herein meant a copolymer in which elastomeric domains, e.g. of ethylene-propylene elastomer (EPR) are formed and dispersed in a homopolymeric or copolymeric matrix.

Preferably, the copolymer (a) is selected from:

($a_1$) a random copolymer of propylene with at least one comonomer selected from ethylene and an α-olefin other than propylene;

($a_2$) a heterophase copolymer comprising a thermoplastic phase based on propylene and an elastomeric phase based on ethylene copolymerized with an α-olefin, preferably with propylene, in which the elastomeric phase is preferably present in an amount of at least 45 wt % with respect to the total weight of the heterophase copolymer.

Particularly preferred of said class ($a_1$) is copolymer of propylene with at least one olefin comonomer selected from ethylene and an α-olefin other than propylene, said copolymer having:

a melting point of from 130° C. to 170° C.; and, a melting enthalpy lower than 20 J/g.

For example, heterophase copolymers of class ($a_2$) are obtained by sequential copolymerization of: i) propylene, possibly containing minor quantities of at least one olefin comonomer selected from ethylene and an α-olefin other than propylene; and then of: ii) a mixture of ethylene with an α-olefin, in particular propylene, and possibly with minor portions of a diene.

Particularly preferred of said class ($a_2$) is a heterophase copolymer wherein the elastomeric phase consists of an elastomeric copolymer of ethylene and propylene comprising from 15 wt % to 50 wt % of ethylene and from 50 wt % to 85 wt % of propylene with respect to the weight of the elastomeric phase.

Examples of products of class ($a_1$) available commercially are Vistalon™ 404, Vistalon™ 606, Vistalon™ 805 (Exxon Chemicals).

Examples of products of products of class ($a_2$) available commercially are Softell® CA02A; Hifax® CA07A; Hifax® CA10A (all from Basell).

According to one preferred embodiment, the propylene homopolymer or propylene copolymer with at least one α-olefin (b) has a melting enthalpy higher than 30 J/g, more preferably of from 50 to 80 J/g. The quantity of said propylene homopolymer or propylene copolymer (b) is preferably of from 5% by weight to 20% by weight with respect to the total weight of the thermoplastic base material.

According to one preferred embodiment, the copolymer (b) has a melting point of from 140° C. to 170° C.

Advantageously, the homopolymer or copolymer (b) has a flexural modulus equal to or higher than 100 MPa, more preferably of from 200 MPa to 1500 MPa.

Advantageously, the homopolymer or copolymer (b) is a heterogeneous copolymer prepared by sequential copolymerization of: (i) propylene, optionally containing at least one α-olefinic comonomer other than propylene; and then of (ii) a mixture of propylene with an α-olefin, in particular ethylene, and optionally a diene. The copolymerization is usually carried out in the presence of Ziegler-Natta catalysts based on halogenated titanium compounds supported on magnesium chloride. Details regarding the preparation of these copolymers are given, for example, in EP-A-0 400 333, EP-A-0 373 660 and U.S. Pat. No. 5,286,564.

The term "α-olefin" refers to ethylene or an olefin of formula $CH_2$—CH—R', where R' is a linear or branched alkyl containing from 2 to 10 carbon atoms. The said α-olefin can be chosen, for example, from: 1-butene, 1-pentene, 1-hexene, 1-octene, 1-dodecene and the like.

Advantageously, the thermoplastic phase of the heterogeneous copolymer comprises a propylene homopolymer or a crystalline copolymer of propylene with an olefin comonomer chosen from ethylene and α-olefins other than propylene. Preferably, the olefin comonomer is ethylene. The amount of olefin comonomer is preferably less than 10 mol % relative to the total number of moles of the thermoplastic phase.

A diene is optionally present as a comonomer. Said diene generally contains from 4 to 20 carbon atoms and is preferably chosen from: linear (non-)conjugated diolefins, for example 1,3-butadiene, 1,4-hexadiene, 1,6-octadiene and the like; monocyclic or polycyclic dienes, for example 1,4-cyclohexadiene, 5-ethylidene-2-norbornene, 5-methylene-2-norbornene and the like.

Advantageously said single phase thermoplastic propylene homopolymer or copolymer has a microscopically homogeneous structure and can be produced by homopolymerization of propylene or copolymerization of propylene with ethylene or an α-olefin other than propylene, in the presence of a Ziegler-Natta catalyst of low stereospecificity. In particular, the catalyst advantageously comprises:

a) a solid catalyst comprising a titanium tetrahalide (e.g., titanium tetrachloride), supported on $MgCl_2$, optionally mixed with an aluminium trihalide (e.g. aluminium trichloride):
b) a co-catalyst comprising trialkyl aluminium, where the alkyl groups are $C_1$-$C_9$ (e.g. triethyl aluminium or triisobutyl aluminum);
c) a Lewis base in an amount generally not greater than 10 mol % with respect to the moles of trialkyl trialuminum.

The addition of the Lewis base in a predetermined amount enables the stereoregularity of the obtained polymer to be controlled. The Lewis base is generally chosen from aromatic acid esters and alkoxysilanes, for example ethylbenzoate, methyl-p-toluate, diisobutylphthalate, diphenyldimethoxysilane, or mixtures thereof. The cocatalyst is added in strong excess over the solid catalyst. The molar ratio of titanium halide to trialkyl aluminium is generally of from 50:1 to 600:1.

A dielectric liquid suitable for use in the covering layer for the cable of the invention is advantageously endowed with various features.

It has been found that the use of a dielectric liquid contributes to increase the breakdown strength of the covering layer. For example, it has been found that the use of a dielectric liquid as described in the following enables to increase the breakdown strength of a polypropylene based insulating layer from about 30 kV/mm in absence of dielectric liquid, up to more than 50 kV/mm, and values over 80 kV/mm have been also achieved.

Preferably, a suitable dielectric has a breakdown strength of at least 3 kV/mm, more preferably higher than 9 kV/mm.

According to a preferred embodiment, the dielectric liquid has a dielectric constant, at 25° C., of less than or equal to 3.5, more preferably less than 3 (measured in accordance with IEC 247).

Other advantageous features of a dielectric liquid suitable for use within the invention are heat resistance, gas absorption capacity, in particular hydrogen absorption, and resistance to partial discharges.

Advantageously, the boiling point of the dielectric liquid should be higher than the temperature that the cable could reach during operation and overcurrent. Preferably, the boiling point of the dielectric fluid is higher than 130° C., more preferably higher than 250° C.

A suitable dielectric liquid is compatible with the thermoplastic polymer material. "Compatible" means that the chemical composition of the liquid and of the thermoplastic polymer material are such as to result into a microscopically homogeneous dispersion of the dielectric liquid in the polymer material upon mixture of the liquid into the polymer, similarly to a plasticizer.

Preferably the dielectric liquid is admixed with the thermoplastic polymer material in amounts lower than the saturation concentration of the dielectric liquid in the thermoplastic polymer material. It has been found that said amounts, specified in the following, do not impair the thermal-mechanical characteristics of the covering layer and avoid the exudation of said dielectric liquid from the thermoplastic polymer material.

The saturation concentration of the dielectric liquid in the thermoplastic polymer material may be determined by a liquid absorption method on Dumbell samples as described, for example, in WO 04/066317.

The weight ratio of dielectric liquid to thermoplastic polymer material of the present invention is generally of from 1:99 to 25:75, preferably of from 2:98 to 20:80.

It has to be noticed also that the use of a dielectric liquid with a relatively low melting point or low pour point (e.g. a melting point or a pour point not higher than 80° C.) allows an easy handling of the dielectric liquid which may be melted with no need of additional and complex manufacturing steps (e.g. a melting step of the dielectric liquid) and/or apparatuses for admixing the liquid with the polymer material.

According to a further preferred embodiment, the dielectric liquid has a melting point or a pour point of from −130° C. to +80° C.

The melting point may be determined by known techniques such as, for example, by Differential Scanning Calorimetry (DSC) analysis.

According to a further preferred embodiment, the dielectric liquid has a predetermined viscosity in order to prevent fast diffusion of the liquid within the insulating layer and hence its outward migration, as well as to enable the dielectric liquid to be easily fed and mixed into the thermoplastic polymer material. Generally, the dielectric liquid of the invention has a viscosity, at 40° C., of from 10 cSt to 800 cSt, preferably of from 20 cSt to 500 cSt (measured according to ASTM standard D445-03).

For example, the dielectric liquid is selected from mineral oils, for example, naphthenic oils, aromatic oils, paraffinic oils, polyaromatic oils, said mineral oils optionally containing at least one heteroatom selected from oxygen, nitrogen or sulfur; liquid paraffins; vegetable oils, for example, soybean oil, linseed oil, castor oil; oligomeric aromatic polyolefins; paraffinic waxes, for example, polyethylene waxes, polypropylene waxes; synthetic oils, for example, silicone oils, alkyl benzenes (for example, dodecylbenzene, di(octylbenzyl) toluene), aliphatic esters (for example, tetraesters of pentaerythritol, esters of sebacic acid, phthalic esters), olefin oligomers (for example, optionally hydrogenated polybutenes or polyisobutenes); or mixtures thereof. Paraffinic oils and naphthenic oils are particularly preferred.

Mineral oils as dielectric liquid can comprise polar compound/s. The amount of polar compound/s advantageously is up to 2.3 wt %. Such a low amount of polar compounds allows to obtain low dielectric losses.

The amount of polar compounds of the dielectric liquid may be determined according to ASTM standard D2007-02.

Alternatively, the dielectric liquid can comprise at least one alkylaryl hydrocarbon having the structural formula:

(I)

wherein:

R1, R2, R3 and R4, equal or different, are hydrogen or methyl;

n1 and n2, equal or different, are zero, 1 or 2, with the proviso that the sum n1+n2 is less than or equal to 3.

In another alternative, the dielectric liquid comprises at least one diphenyl ether having the following structural formula:

where $R_5$ and $R_6$ are equal or different and represent hydrogen, a phenyl group non-substituted or substituted by at least one alkyl group, or an alkyl group non-substituted or substituted by at least one phenyl. By alkyl group it is meant a linear or branched $C_1$-$C_{24}$, preferably $C_1$-$C_{20}$, hydrocarbon radical.

A suitable dielectric liquid for use in the covering layer for the cable of the invention is described, e.g., in WO 02/027731, WO 02/003398 or WO 04/066317, all in the Applicant's name.

Preferably, the covering layer for the energy cable of the invention has a melting enthalpy equal to or lower than 35 J/g, and more preferably of from 30 to 5 J/g.

Advantageously, the covering layer has a melt flow index (I), measured at 230° C. with a load of 21.6 N according to ASTM standard D1238-00, of from 0.05 dg/min to 10.0 dg/min, more preferably from 0.4 dg/min to 5.0 dg/min.

The thermoplastic polymer material that, together with the dielectric fluid, yields the covering layer for the cable of the invention, and that comprises (a) at least 75% by weight, with respect to the total weight of the thermoplastic polymer material, of at least one copolymer of at least two α-olefin comonomers, said copolymer having a melting enthalpy lower than 25 J/g; and (b) an amount equal to or less than 25% by weight with respect to the total weight of the thermoplastic polymer material of at least one propylene homopolymer or propylene copolymer with at least one aliphatic α-olefin, said at least one propylene homopolymer or propylene copolymer having a melting enthalpy higher than 25 J/g and a melting point higher than 130° C.;

shows a melting enthalpy substantially equal to or lower than 40 J/g.

According to one preferred embodiment, the cable of the invention has at least one extruded covering layer with electrical insulation properties formed from the thermoplastic polymer material in admixture with the dielectric liquid as from above.

According to a further preferred embodiment, the cable of the invention has at least one extruded covering layer with semiconductive properties formed from the thermoplastic polymer material in admixture with the dielectric liquid as from above. To form a semiconductive layer, a conductive filler is generally added to the polymer material. To ensure a suitable dispersion of the conductive filler within the thermoplastic polymer material, the latter is preferably selected from propylene homopolymers or copolymers comprising at least 40 wt % of amorphous phase, with respect to the total polymer weight.

According to a further aspect, the present invention relates to a polymer composition comprising a thermoplastic polymer material in admixture with a dielectric liquid, wherein said thermoplastic polymer material comprises (a) at least 75% by weight, with respect to the total weight of the thermoplastic polymer material, of at least one copolymer of at least two α-olefin comonomers, said copolymer having a melting enthalpy lower than 25 J/g; and (b) an amount equal to or less than 25% by weight with respect to the total weight of the thermoplastic polymer material of at least one propylene homopolymer or propylene copolymer with at least one aliphatic α-olefin, said at least one propylene homopolymer or propylene copolymer having a melting enthalpy higher than 25 J/g and a melting point higher than 130° C.;

said covering layer having a melting enthalpy equal to or lower than 40 J/g, and the concentration by weight of said dielectric liquid in said thermoplastic polymer material is lower than the saturation concentration of said dielectric liquid in said thermoplastic polymer material.

According to a further aspect, the present invention relates to the use of a polymer composition, as described hereinabove, as the polymer base material for preparing a cable covering layer with electrical insulation properties, or for preparing a cable covering layer with semiconductive properties.

In forming a covering layer for the cable of the invention, other conventional components may be added to the above-defined polymer composition, such as antioxidants, processing aids, water tree retardants, or mixtures thereof.

Conventional antioxidants suitable for the purpose are, for example, distearyl- or dilauryl-thiopropionate and pentaerythrityl-tetrakis [3-(3,5-di-t-butyl-4-hydroxyphenyl)propionate], or mixtures thereof.

Processing aids which may be added to the polymer composition include, for example, calcium stearate, zinc stearate, stearic acid, or mixtures thereof.

With particular reference to medium and high voltage cables, the polymer materials as defined hereinabove may be advantageously used to obtain an insulating layer. The resistance to thermopressure attained by covering insulating layer as from the present invention allows medium voltage and high voltage power cables comprising them to operate at 90° C. or more without performance impairing, and being endowed with a superior flexibility with respect to known propylene thermoplastic power cables.

If the covering layer of the present invention is a semiconductive layer, a conductive filler, in particular carbon black, is generally dispersed within the polymer base material in a quantity such as to provide the material with semiconductive characteristics (i.e. such as to obtain a resistivity of less than 5 Ω·m at ambient temperature). This amount is generally between 5 wt % and 80 wt %, and preferably between 10 wt % and 50 wt %, of the total weight of the mixture.

The use of the same base polymer composition for both the insulating layer and the semiconductive layers is particularly advantageous in producing cables for medium or high voltage, in that it ensures excellent adhesion between adjacent layers and hence a good electrical behavior, particularly at the interface between the insulating layer and the inner semiconductive layer, where the electrical field and hence the risk of partial discharges are higher.

The polymer composition for the covering layer of the cable of the invention may be prepared by mixing together the thermoplastic polymer material, the dielectric liquid and any other additives possibly present by using methods known in the art. Mixing may be carried out for example by an internal mixer of the type with tangential rotors (Banbury) or with interpenetrating rotors; in a continuous mixer of Ko-Kneader (Buss) type, of co- or counter-rotating double-screw type; or in a single screw extruder.

The thermoplastic polymer material may be previously manufactured in a polymerization reactor or by feeding the components (a) and (b) together with the dielectric fluid into the mixing apparatus for the polymer composition as exemplified just above.

Alternatively, the dielectric liquid of the present invention may be added to the thermoplastic polymer material during the extrusion step by direct injection into the extruder cylinder as disclosed, for example, in International Patent Application WO 02/47092 in the name of the Applicant.

Greater compatibility has also been found between the dielectric liquid and the thermoplastic polymer material of the present invention than in the case of similar mixtures of the same polymer material with other dielectric liquids known in the art. This greater compatibility leads, inter alia, to less exudation of the dielectric liquid. Due to their high operating temperature and their low dielectric losses, the cables of the invention can carry, for the same voltage, a power at least equal to or even greater than that transportable by a traditional cable with XLPE covering.

For the purposes of the invention the term "medium voltage" generally means a voltage of between 1 kV and 35 kV, whereas "high voltage" means voltages higher than 35 kV.

Although this description is mainly focused on the production of cables for transporting or distributing medium or high voltage energy, the polymer composition of the invention may be used for covering electrical devices in general and in particular cables of different type, for example low voltage cables (i.e. cables carrying a voltage less than 1 kV), telecommunications cables or combined energy/telecommunications cables, or accessories used in electrical lines, such as terminals, joints, connectors or the like.

BRIEF DESCRIPTION OF THE DRAWING

Further characteristics will be apparent from the detailed description given hereinafter with reference to the accompanying drawing, in which.

DETAILED DESCRIPTION OF THE PREFERRED EMBODIMENTS

Figure 1:
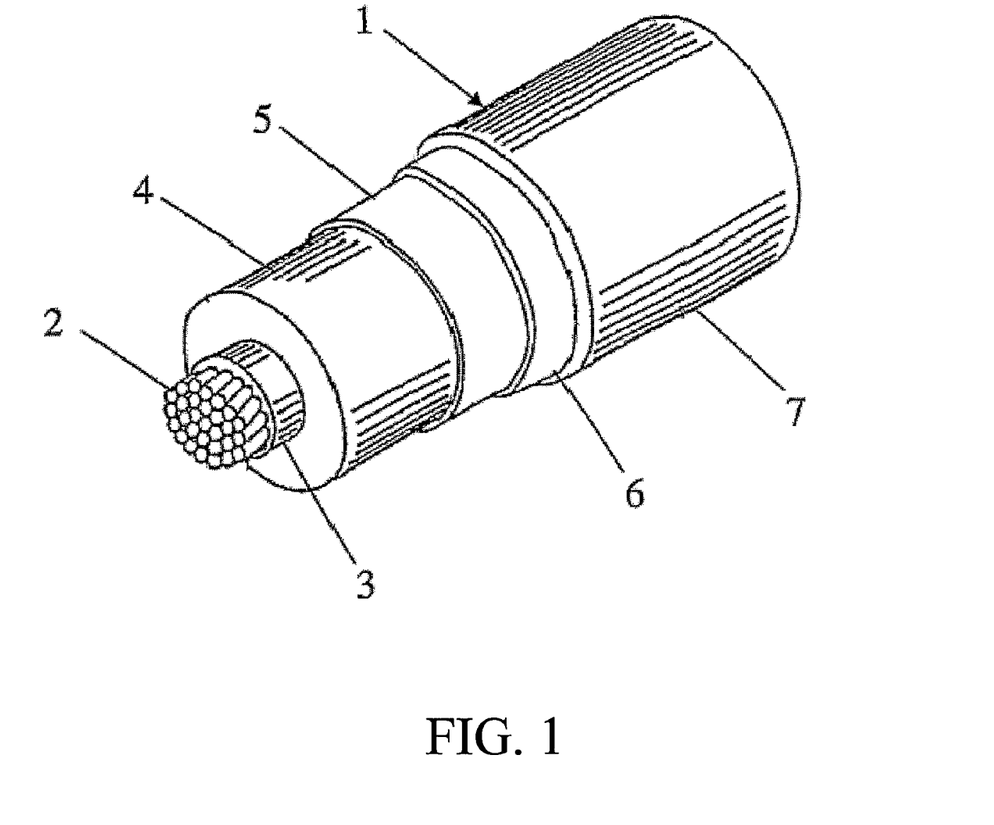
FIG. 1 is a perspective view of an electric cable, particularly suitable for medium or high voltage, according to the invention.

In FIG. 1, the cable (1) comprises a conductor (2), an inner layer with semiconductive properties (3), an intermediate layer with insulating properties (4), an outer layer with semiconductive properties (5), a metal screen (6), and an outer sheath (7).

The conductor (2) generally consists of metal wires, preferably of copper or aluminium, stranded together by conventional methods, or of a solid aluminium or copper rod. At least one covering layer selected from the insulating layer (4) and the semiconductive layers (3) and (5) comprises the composition of the invention as heretofore defined. Around the outer semiconductive layer (5) there is usually positioned a screen (6), generally of electrically conducting wires or strips helically wound. This screen is then covered by a sheath (7) of a thermoplastic material such as, for example, non-crosslinked polyethylene (PE).

The cable can be also provided with a protective structure (not shown in FIG. 1) the main purpose of which is to mechanically protect the cable against impacts or compressions. This protective structure may be, for example, a metal reinforcement or a layer of expanded polymer as described in WO 98/52197 in the name of the Applicant.

FIG. 1 shows only one embodiment of a cable according to the invention. Suitable modifications can be made to this embodiment according to specific technical needs and application requirements without departing from the scope of the invention.

The cable covering layer or layers of thermoplastic material according to the present invention may be manufactured in accordance with known methods, for example by extrusion. The extrusion is advantageously carried out in a single pass, for example by the tandem method in which individual extruders are arranged in series, or by co-extrusion with a multiple extrusion head.

The following examples illustrate the invention, but without limiting it.

Examples 1-8

Cables provided with a covering layer according to the invention and with a comparative covering layer were prepared.

The covering layers according to the invention had the compositions set forth in Table

TABLE 1

| Example | 1 | 2 | 3 | 4 | 5 | 6 |
|---|---|---|---|---|---|---|
| Softell CA 02 A | 80 | 85 | 90 | 80 | 90 | 80 |
| Moplen EP 310G | 20 | 15 | 10 | — | — | — |
| Moplen RP 210G | — | — | — | 20 | 10 | — |
| Borsoft SA 233 CF | — | — | — | — | — | 20 |

The amount reported in Table 1 are % by weight with respect to the total weight of the thermoplastic polymer material.

Softell® CA 02 A: heterophase EPR copolymer, melting point 143° C., melting enthalpy 12.4 J/g, MFI 0.6 dg/min and flexural modulus 20 MPa (commercial product of Basell);

Moplen® RP 210G: propylene-ethylene random copolymer melting point 146° C., melting enthalpy 65.1 J/g, MFI 1.8 dg/min and flexural modulus of 800 MPa (commercial product of Basell);

Moplen® EP 310D: EPR heterophase copolymer of propylene, melting point 165° C., melting enthalpy 71.8 J/g, MFI 0.8 dg/min and flexural modulus of 1050 MPa (commercial product of Basell);

Borsoft® SA 233 CF: random propylene-ethylene copolymer with EPR heterophase copolymer, melting point 142° C., melting enthalpy 65 J/g, MFI 0.8 dg/min and flexural modulus of 400 MPa (commercial product of Borealis);

As dielectric fluid Jarylec® EXP3 (boiling point 390° C., marketed by Arkema) added to each thermoplastic mixture in an amount of 6% by weight with respect to the weight of the covering layer composition Comparative covering layers had the compositions set forth in Table 2.

TABLE 2

| Example | 7 | 8 |
|---|---|---|
| Moplen RP 210G | 70 | — |
| Hifax 7320 | 30 | — |
| Adflex Q200 F | — | 100 |

The amount reported in Table 2 are as from Table 1.

Moplen® RP 210G: propylene-ethylene random copolymer, melting point 146° C., melting enthalpy 65.1 J/g, MFI 1.8 dg/min and flexural modulus of 800 MPa (commercial product of Basell);

Hifax® 7320: ethylene-propylene heterophase copolymer with melting point 165° C., melting enthalpy 27.0 J/g, MFI 2.5 dg/min and flexural modulus of 200 MPa (commercial product of Basell);

Adflex® Q200 F: propylene heterophase copolymer with melting point 165° C., melting enthalpy 30 J/g, MFI 0.8 dg/min and flexural modulus 150 MPa (commercial product of Basell);

The compositions of examples 7 and 8 contained an amount of 6% by weight with respect to the weight of the covering layer composition of dielectric fluid Jarylec® EXP3.

The polymeric compositions of Table 1 and 2 were used as insulating layers in the manufacturing power cables according to the following.

Each polymeric base was fed directly into the extruder hopper. Subsequently, dielectric fluid, previously mixed with the antioxidants, was injected at high pressure into the extruder. An extruder having a diameter of 80 mm and an L/D ratio of 25 was used. The injection was made during the extrusion at about 20 D from the beginning of the extruder screw by means of three injections point on the same cross-section at 1200 from each other. The dielectric liquid was injected at a temperature of 70° C. and a pressure of 250 bar.

The cable leaving the extrusion head was cooled to ambient temperature by passing it through cold water.

The finished cable consisted of an aluminum conductor (cross-section 150 mm$^2$), an inner semiconductive layer of about 0.5 mm in thickness, an insulating layer of one of the polymeric compositions of Tables 1 or 2 of about 4.5 mm in thickness, and an outer semiconductive layer of about 0.5 mm in thickness.

Measurement of Cable Flexibility

The flexibility of cables was measured according to CENELEC method TC20/WG9, that contains all details about equipment, preparation of samples and testing procedure. The results are set forth in Table 3.

Measurement of Melting Point ($T_m$), Melting Enthalpy ($\Delta H$) and Thermopressure Resistance The melting point ($T_m$) and the melting enthalpy ($\Delta H$) of the insulating layers of each tested power cable were determined by Differential Scanning Calorimetry (DSC) analysis by using a Mettler Toledo DSC 820 differential scanning calorimeter. The temperature program below was applied to the sample to be analyzed:

cooling from room temperature to 10° C.;
heating from 10° C. to 190° C. at a rate of 10° C./min.;
isotherm for 5 minutes at 190° C.;
cooling to 10° C. at a rate of 10° C./min;
isotherm for 10 minutes at 10° C.;
heating to 190° C. at a rate of 10° C./min.

The thermopressure resistance of each tested power cable was measured according to the CEI rule EN 60811-3-1 Par. 8. The obtained results are given in Table 3.

TABLE 3

| EXAMPLE | Flexural modulus (kg) | Thermopressure at 120° C. (%) | Melting point ($T_m$) (° C.) | Melting enthalpy ($\Delta H$) (J/g) |
|---|---|---|---|---|
| 1 | 16.3 | 80.6 | 162 | 21.2 |
| 2 | 14.9 | 75.2 | 162 | 18.2 |
| 3 | 15.6 | 72.0 | 160 | 14.1 |
| 4 | 14.3 | 79.0 | 146 | 23.1 |
| 5 | 15.1 | 60.0 | 150 | 11.9 |
| 6 | 17.2 | 81.0 | 145 | 20.0 |
| 7 | 32.4 | 90.9 | 157 | 42.5 |
| 8 | 18.1 | 80.0 | 164 | 25.0 |

The results set forth in Table 3 shows that the covering layer for the cable of the invention provide the cable with an improved flexibility with respect to those previously known, while maintaining the thermopressure resistance substantially unchanged.

Thermopressure is of particular importance for evaluating the performance and reliability of an energy cable, because this characteristic provides indication about the cable (the insulating layer) capacity of standing deformation stress at high temperatures, e.g. the temperature reached under overvoltage conditions.

The invention claimed is:

1. A cable comprising at least one electrical conductor and at least one extruded covering layer comprising a thermoplastic polymer material in admixture with a dielectric liquid, wherein said thermoplastic polymer material comprises:
    (a) at least 75% by weight, with respect to the total weight of the thermoplastic polymer material, of at least one copolymer of at least two α-olefin comonomers, said copolymer having a melting enthalpy lower than 25 J/g; and;
    (b) an amount equal to or less than 25% by weight with respect to the total weight of the thermoplastic polymer material of at least one propylene homopolymer or propylene copolymer with at least one α-olefin, said at least one propylene homopolymer or propylene copolymer having a melting enthalpy higher than 25 J/g and a melting point higher than 130° C., said covering layer having a melting enthalpy equal to or lower than 40 J/g, and the concentration by weight of said dielectric liquid in said thermoplastic polymer material being lower than the saturation concentration of said dielectric liquid in said thermoplastic polymer material.

2. The cable according to claim 1, wherein the extruded covering layer based on said thermoplastic polymer material in admixture with said dielectric liquid is an electrically insulating layer.

3. The cable according to claim 1, wherein the extruded covering layer based on said thermoplastic polymer material in admixture with said dielectric liquid is a semiconductive layer.

4. The cable according to claim 1, wherein the copolymer (a) is present in an amount of 80% by weight to 95% by weight with respect to the total weight of the thermoplastic polymer material.

5. The cable according to claim 1, wherein the copolymer (a) has a melting enthalpy of 15 J/g to 10 J/g.

6. The cable according to claim 1, wherein the copolymer (a) has a flexural modulus of 80 MPa to 10 MPa.

7. The cable according to claim 6, wherein the copolymer (a) has a flexural modulus of 40 MPa to 20 MPa.

8. The cable according to claim 1, wherein the at least two α-olefin comonomers of the at least one copolymer (a) are selected from ethylene or an α-olefin of formula $CH_2=CH-R$, where R is a linear or branched $C_1$-$C_{10}$ alkyl.

9. The cable according to claim 1, wherein the copolymer (a) is a propylene/ethylene copolymer.

10. The cable according to claim 1, wherein at least one of the at least two α-olefin comonomers is propylene.

11. The cable according to claim 1, wherein the copolymer (a) is a random copolymer or a heterophase copolymer.

12. The cable according to claim 1, wherein the copolymer (a) is a random copolymer ($a_1$) of propylene with at least one comonomer selected from ethylene and an α-olefin other than propylene.

13. The cable according to claim 12, wherein ($a_1$) is a copolymer of propylene with at least one olefin comonomer selected from ethylene and an α-olefin other than propylene, said copolymer having:
    a melting point of 130° C. to 170° C.; and
    a melting enthalpy lower than 20 J/g.

14. The cable according to claim 1, wherein the copolymer (a) is a heterophase copolymer ($a_2$) comprising a thermoplastic phase based on propylene and an elastomeric phase based on ethylene copolymerized with an α-olefin.

15. The cable according to claim 14, wherein the α-olefin is propylene.

16. The cable according to claim 14, wherein the elastomeric phase is present in an amount of at least 45 wt % with respect to the total weight of the heterophase copolymer.

17. The cable according to claim 16, wherein ($a_2$) is a heterophase copolymer wherein the elastomeric phase comprises an elastomeric copolymer of ethylene and propylene comprising 15 wt % to 50 wt % of ethylene and 50 wt % to 85 wt % of propylene with respect to the weight of the elastomeric phase.

18. The cable according to claim 1, wherein the propylene homopolymer or propylene copolymer with at least one aliphatic α-olefin (b) has a melting enthalpy higher than 30 J/g.

19. The cable according to claim 18, wherein the propylene homopolymer or propylene copolymer with at least one α-olefin (b) has a melting enthalpy of 50 to 80 J/g.

20. The cable according to claim 1, wherein the copolymer (b) has a melting point of 140° C. to 170° C.

21. The cable according to claim 1, wherein the amount of said propylene homopolymer or propylene copolymer (b) is 5% by weight to 20% by weight with respect to the total weight of the thermoplastic base material.

22. The cable according to claim 1, wherein the at least one α-olefin of (b) is selected from ethylene or an olefin of formula $CH_2=CH-R'$, where R' is a linear or branched alkyl containing from 2 to 10 carbon atoms.

23. The cable according to claim 22, wherein the α-olefin is ethylene.

24. The cable according to claim 1, wherein the amount of α-olefin of (b) is less than 10 mol % relative to the total number of moles of the thermoplastic phase.

25. The cable according to claim 1, wherein a diene is present in (b).

26. The cable according to claim 1, wherein the dielectric liquid has a breakdown strength of at least 3 kV/mm.

27. The cable according to claim 26, wherein the dielectric liquid has a breakdown strength higher than 9 kV/mm.

28. The cable according to claim 1, wherein the dielectric liquid has a boiling point higher than 130° C.

29. The cable according to claim 28, wherein the dielectric liquid has a boiling point higher than 250° C.

30. The cable according to claim 1, wherein the dielectric liquid has a melting point or a pour point of −130° C. to +80° C.

31. The cable according to claim 1, wherein the dielectric liquid has a dielectric constant, at 25° C., of less than or equal to 3.5.

32. The cable according to claim 31, wherein the dielectric liquid has a dielectric constant, at 25° C., of less than 3.

33. The cable according to claim 1, wherein the dielectric liquid has a viscosity, at 40° C., of 10 cSt to 800 cSt.

34. The cable according to claim 33, wherein the dielectric liquid has a viscosity, at 40° C., of 20 cSt to 500 cSt.

35. The cable according to claim 1, wherein the dielectric liquid is a mineral oil comprising up to 2.3 wt % of polar compounds.

36. The cable according to claim 1, wherein the dielectric liquid is selected from paraffinic oils and naphthenic oils.

37. The cable according to claim 1, wherein the dielectric liquid comprises at least one alkylaryl hydrocarbon having the structural formula:

wherein:
R1, R2, R3 and R4, the same or different, are hydrogen or methyl; and
n1 and n2, the same or different, are zero, 1 or 2, with the proviso that the sum n1+n2 is less than or equal to 3.

38. The cable according to claim 1, wherein the dielectric liquid comprises at least one diphenyl ether having the following structural formula:

where $R_5$ and $R_6$ are equal or different and represent hydrogen, a phenyl group non-substituted or substituted by at least one alkyl group, or an alkyl group non-substituted or substituted by at least one phenyl, and where alkyl group is defined as a linear or branched $C_1$-$C_{24}$, or $C_1$-$C_{20}$, hydrocarbon radical.

39. The cable according to claim 1, wherein the dielectric liquid is present in a weight ratio to thermoplastic polymer material of 1:99 to 25:75.

40. The cable according to claim 1, wherein the dielectric liquid is present in a weight ratio to thermoplastic polymer material of 2:98 to 20:80.

41. The cable according to claim 1, wherein the covering layer has a melting enthalpy equal to or lower than 35 J/g.

42. The cable according to claim 41, wherein the covering layer has a melting enthalpy of 30 to 5 J/g.

43. The cable according to claim 1, wherein the covering layer has a melt flow index, measured at 230° C. with a load of 21.6 N according to ASTM standard D1238-00, of 0.05 dg/min to 10.0 dg/min.

44. The cable according to claim 43, wherein the covering layer has a melt flow index, measured at 230° C. with a load of 21.6 N according to ASTM standard D1238-00, of 0.4 dg/min to 5.0 dg/min.

45. The cable according to claim 1, wherein the at least one extruded covering layer has electrical insulation properties.

46. The cable according to claim 1, comprising a high or medium voltage cable.

47. A polymer composition comprising a thermoplastic polymer material in admixture with a dielectric liquid, wherein said thermoplastic polymer material comprises:
(a) at least 75% by weight, with respect to the total weight of the thermoplastic polymer material, of at least one copolymer of at least two α-olefin comonomers, said copolymer having a melting enthalpy lower than 25 J/g; and
(b) an amount equal to or less than 25% by weight with respect to the total weight of the thermoplastic polymer material of at least one propylene homopolymer or propylene copolymer with at least one aliphatic α-olefin, said at least one propylene homopolymer or propylene copolymer having a melting enthalpy higher than 25 J/g and a melting point higher than 130° C.;
said thermoplastic polymer having a melting enthalpy equal to or lower than 40 J/g, and the concentration by weight of said dielectric liquid in said thermoplastic polymer material being lower than the saturation concentration of said dielectric liquid in said thermoplastic polymer material.

48. A polymer base material for preparing a cable covering layer with electrical insulation properties comprising the polymer composition of claim 47.

49. A thermoplastic polymer material comprising:
(a) at least 75% by weight, with respect to the total weight of the thermoplastic polymer material, of at least one copolymer of at least two α-olefin comonomers, said copolymer having a melting enthalpy lower than 25 J/g; and
(b) an amount equal to or less than 25% by weight with respect to the total weight of the thermoplastic polymer material of at least one propylene homopolymer or propylene copolymer with at least one aliphatic α-olefin, said at least one propylene homopolymer or propylene copolymer having a melting enthalpy higher than 25 J/g and a melting point higher than 130° C.;
said thermoplastic polymer having a melting enthalpy equal to or lower than 40 J/g.

* * * * *